United States Patent Office 3,457,494
Patented July 22, 1969

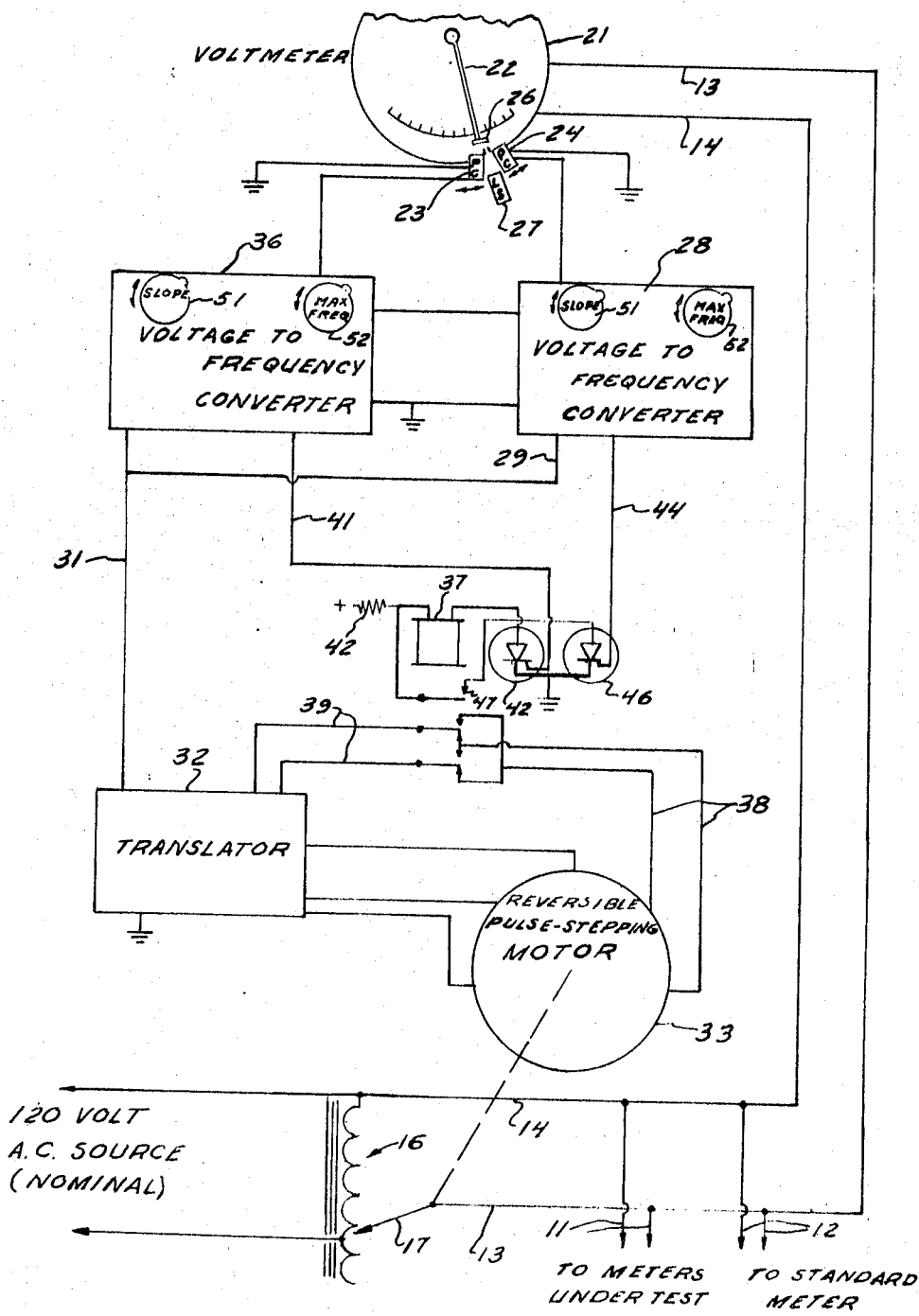

3,457,494
VOLTAGE REGULATION WITH CORRECTION SPEED PROPORTIONAL TO ERROR
Harley L. Friend, Lafayette, and Robert L. Cattell, West Lafayette, Ind., assignors to Duncan Electric Company, Inc., a corporation of Indiana
Filed July 5, 1966, Ser. No. 562,707
Int. Cl. H02p *13/06;* H02m *5/12*
U.S. Cl. 323—43.5                                          5 Claims

ABSTRACT OF THE DISCLOSURE

Precision control of an autotransformer for maintaining a constant voltage is achieved by an electrical system which varies the speed of drive of a motor which adjusts the autotransformer so that the speed is somewhat proportional to the magnitude of departure of the voltage from the desired voltage. The amount of departure is determined by photocells without affecting the accuracy of a volt meter with which they cooperate. The speed of the motor is varied by driving it with varying frequency, the frequency being varied according to the variations of voltage of the photocell outputs.

Introduction

The invention, of which this disclosure is offered for public dissemination in the event adequate patent protection is available, relates to control of a variable value such as voltage, current, or phase relationship, and is especially useful when such control must be relatively precise, as is desirable for calibrating watt-hour meters, for example.

The meters by which homeowners and others are billed for their electric power supply are technically known as watt-hour meters. Each such meter is individually calibrated (adjusted to accuracy) at the factory. The usual methods of calibration include comparing the meter being calibrated with an accurate standard meter while subjecting both to a common energizing circuitry. Under the ever-increasing high standards of accuracy, it is increasingly desirable that the voltage used during calibration be held quite precisely to a predetermined value, such as the nominal voltage for which the meter being calibrated is designed. The most convenient source from which to derive the constant voltage is the power line which supplies the factory or the nearest branch from it. Such a source can be expected to have voltage variations which would be intolerable for modern standards of meter calibration.

Maintaining a satisfactorily constant voltage when derived from a voltage which, relatively, is wildly varying, presents some problems. When there is a wild variation, quick adjustment to counteract for it is desirable. Such high speed adjustment would be very undesirable, however, in the much more usual instance of a very trivial variation of the source voltage. With high speed adjustment at that time, especially with a regulator having a moving part, it would be very difficult to avoid overshooting and producing greater error in the opposite direction than the initiating error.

Some voltage regulators which might be satisfactory in other respects, such as electronic voltage regulators, are unsuitable for watt-hour meter testing because they change the wave shape of the alternating current voltage. To avoid introduction of wave-shape errors, regulation by an autotransformer, which yields a good sine wave, is desirable. Autotransformer regulators tend to require a relatively wide threshold error before they can produce a corrective adjustment.

According to the present invention, the speed of the correcting adjustment tends to be proportional to the error being corrected. This is accomplished while at the same time maintaining extreme accuracy of the null point, the point at which no correction is made. Accuracy is obtained in part by using a pair of photocells for determining the error in either direction of the indicator on an indicating instrument responsive to the controlled voltage. Through suitable circuitry, the voltage derived from the photocells, which in turn tends to be proportional to the voltage error, is converted to a frequency proportional to the photocell voltage and therefore also to the voltage error. Through the use of a suitable translator and suitable direction control, this frequency is used in turn to drive a step-per-pulse motor. The speed of correction is then proportional to the error, through a wide range, by virtue of the fact that the motor used moves accurately through a given angle for each pulse. Thus, a high frequency, corresponding to a large error to be corrected, drives the motor fast whereas a very low frequency, corresponding to a very slight error to be corrected, drives the motor correspondingly slowly. Of course, the motor adjusts a regulator (in the case of voltage, an autotransformer or the like to vary the proportion by which the supply voltage is stepped up or stepped down to yield the desired constant voltage).

Additional advantages and objects of the invention will be apparent from the following description and from the drawing.

The drawing includes a diagrammatic representation of some structure and a simplified circuit diagram of the form of the invention chosen for illustration.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the part, improvements, or combinations in which the inventive concepts are found.

Background description

The invention has been illustrated in connection with regulation of a voltage or potential source for watt-hour meter (the ordinary electricity with which the homeowner is familiar) each meter is individually calibrated (adjusted) to provide accuracy. Conventional manners of calibration include a step of making a comparison run between one or more meters being calibrated and a standard meter, while they are connected to common energizing circuitry. Thus the energization of their potential coils is derived from the same source so that for all meters in the comparison run, the applied voltage will be either equal or accurately correlated.

In the sole figure, a pair of leads 11 lead directly or indirectly to the meter potential coils under test, and a pair of leads 12 lead, usually directly, to the potential coil of the standard meter or its equivalent. Both come from the same regulated potential source comprising wires 13 and 14. As in the past, the regulated voltage of wires 13 and 14 is derived from a non-uniform source such as the handiest source of commercial alternating current at a nominal 120 volts. For calibration of meters, where sine-wave voltage is highly desirable, the regulation of the voltage is commonly, if not always, accomplished by means of an autotransformer 16, with its tap 17 automatically moved one way or the other to compensate for fluctuations in the voltage of the source.

The present invention relates to the manner of automatically adjusting the tap 17 to provide more dependably accurate voltage regulation than has heretofore been provided in systems suitable for watt-hour meter calibration.

Although watt-hour meters are in use subjected to varying voltages and are amazingly accurate in their measurements in spite of such variations, it is desirable to hold the potential as accurately as possible during calibration. Otherwise, even such slight errors as can occur due to voltage variation would make the meter seem to require a different adjustment of the calibrating screws than the correct amount.

Operational description of invention

According to the present invention, the voltage to be regulated, or a circuit representative of some other value to be regulated, is led to an accurate indicating meter 21. In the case of regulating voltage or regulating something of which voltage is representative, this meter will be a volt meter. Movement of its indicator 22 will affect oppositely to pick up devices 23 and 24 which in the illustrated form of the invention are photocells and receive light from a light disseminator 26 carried by the indicator 22, and illuminated by a light source 27.

If the regulated voltage of wires 13 and 14 should be too high, pointer 22 would swing to the right and increase the amount of light falling on photocell 24. This would produce a voltage somewhat proportional to the amount of displacement of the pointer 22 from its position corresponding to the desired or normal regulated voltage. A voltage-to-frequency converter 28 converts this voltage to a series of impulses, this frequency of which varies generally in proportion to the voltage, and hence in proportion to the displacement of pointer 22 from normal. The output impulses of converter 28 is transmitted by wires 29 and 31 to a translator 32 which converts each impulse to an output suitable for driving motor 33 through one small predetermined increment. The motor 33 is mechanically connected to tap 17 to move it along the autotransformer 16, and in this instance in a direction to reduce the voltage applied to wires 13 and 14.

If the regulated voltage is only slightly above the normal voltage, only a little light will strike photocell 24. Its voltage output will be low, the resulting frequency will be low, and motor 33 will move only a few steps per second and will be very unlikely to over-correct the voltage error which caused its movement. However, if the source voltage should have a sudden major increase so that the voltage across lines 13 and 14 were high above normal, more nearly maximum light would strike photocell 24, the resultant frequency would be high, and motor 33 would move at or near its desired maximum speed so as to begin quick correction of the drastic error. As the rapidly moving tap 17 approaches the position of full correction so that the regulated voltage is approaching its normal value, the return of pointer 22 will begin to reduce the amount of light on photocell 24 which will reduce the frequency of output of converter 28 which will reduce the speed of motor 33 so that minimum speed will be reached just before the normal voltage is reached, and again over-correction will be avoided.

If the voltage is too low, pointer 22 will swing to the left of normal and will increase the light picked up by photocell 23, associated with voltage-to-frequency converter 36. Again, an output in proportion to voltage will be transmitted over wire 31 to translator 32, for causing motor drive impulses of a corresponding frequency. In this, however, the direction of drive of motor 33 will be the opposite of that previously discussed. This reversal is accomplished by reversing relay 37 which reverses the connections between wires 38 and wires 39.

Relay 37 is jointly controlled by the converters 28 and 36. Concurrently with the first pulse from converter 36 to wire 31, a pulse over wire 41 to the gate terminal of silicon-controlled rectifier (SCR) 42 triggers that rectifier to allow current to flow from a suitable source through resistance 42 and the coil of relay 37 to ground. An SCR is self-sustaining until the current flow through it has reduced below the sustaining level and therefore, once this rectifier 42 is triggered, relay 37 remains energized until something happens to change it. The pulses received by translator 32 therefore cause the drive of motor 33 in the voltage raising direction.

Thereafter when the first pulse from converter 28 over line 29 occurs, there is also a pulse over line 44 to the gate electrode of SCR 46. Inasmuch as we are assuming that delay 37 has remained energized, the contacts 47 will be closed and when the pulse over line 44 makes SCR 46 conductive, this will close a circuit from the source through resistor 42 and contacts 47 to ground, bypassing the relay coil 37 so that current through that coil substantially stops, with two effects.

(1) It releases its armature, opening contact 47 and also reversing the direction of drive motor 33 to restore it to the voltage-lowering direction, and;

(2) The discontinuance of current through SCR 42 extinguishes it so that it no longer conducts until again triggered by its gate electrode.

The opening of contacts 47 immediately discontinues the flow of current through SCR 46, but relay 37 nevertheless continues to be deenergized until an impulse over line 41 again triggers or fires SCR 42.

Adjustments

Both of the photocells 23 and 24 can preferably be swung about the axis of pointer 22. Preferably each is adjustable delicately and easily, as by a knob and pinion acting on a toothed segment. Movement of photocell 24 adjusts the high set-point and movement of photocell 23 adjusts the low-set point. By set-point is meant the point at which a corrective response begins. For some purposes, a greater departure from normal may be tolerable in one direction than in the other, and in that event, the photocells may be moved to place the set-points accordingly. For maximum precision of the regulated voltage, the photocells can be carefully adjusted to make the two set-points virtually continuous so that any discernable departure of the voltage from the normal initiates correction.

As indicated by the control knobs 51 and 52, each voltage to frequency converter is preferably adjustable as to its slope, or rate of frequency change (knobs 51) and as to the maximum frequency it will produce (knobs 52). These adjust appropriate rheostats in the circuitry. In other words, each knob 52 controls the maximum speed of adjustment which motor 33 may reach for the direction it controls, while each knob 51 controls the amount of pointer deflection 22 which is needed beyond the set-point to accomplish a given motor speed below the maximum to which the knobs 52 are set.

Standard components

One of the advantages of the present invention is that to a large extent standard components can be used. Motors suitable for use as a motor 33 are readily available on the market as bifilar synchronous motors, and translators 32 for use with them are also readily available. Both are available. Both are available, for example, for the Superior Electric Co. under the trademark "Slo-Syn." Accurate volt meters are readily available, as are suitable autotransformers. The remainder of the circuitry can readily be made up from known techniques, using standard or readily provided parts. The photocells at present preferred are photo-resistors. The light disseminator 26 presently preferred is a fresnel prism, rather than the reflective disseminator 26 diagrammatically illustrated. Preferably each photocell operates in conjunction with a set-point indicator so that the operator can easily see the approximate location of the set-point. Such pointers have been suggested by small pointers, non-numbered on photocells 23 and 24. Of course, light disseminator 26 need not actually be on the pointer 22 but may be mounted separately on the shaft for pointer 22. It may be behind the base of the instrument, in which case photocells 23 and 24 would also be behind the base of the instrument and the set-point indicators would then be extended to the front of the instrument for visibility.

Alternative uses

The same system of regulation illustrated in FIGURE 1 has already been used also for power factor or phase relationship regulation. In this instance, the virtually identical equipment shown may be used, the autotransformer 16 being differently connected, however, to control phase relationship in a conventional manner. The voltage thus produced is not directly fed to volt meter 21, but instead is fed (together with current from which its phase displacement is to be measured) to a converter which converts the displacement into voltage. It is this voltage therefore which is fed to the voltmeter 21.

For controlling current, the meter 21 may be an ammeter, and the motor 23 can control a variable resistor or other current-control device. Almost any other adjustment value can be controlled by using an indicator meter 21 which is responsive to that value either directly or indirectly.

In any use, the meter is not necessarily an indicating meter, nor are photocells the only possible pick-ups. It is important that this meter and pick-up system be free from pick-up inhibition of accuracy.

Achievement

From the foregoing it is seen that a highly dependable, highly accurate, and highly flexible regulation system is provided. It has already been found to be quite valuable in closely regulating voltage and phase displacement for watt-hour meter calibration.

We claim:

1. A regulating system for producing a relatively constant value including an instrument responsive to the value, a non-constant source from which the value can be derived, an adjustable regulator by which the constant value can be derived from the non-constant source, and means for controlling the adjustable regulator under command of the instrument including:
   a pair of photocells positioned to receive light varied oppositely by the instrument in response to variations of the value which it measures for producing value-related voltages which are likewise inversely varied;
   conversion means responsive to the photocells for producing value-related frequencies varying with variations of said value-related voltage, and a motor connected to adjust said regulator and designed to run synchronously with a wide range of energizing value-related frequencies;
   and means to energize said motor according to the varying value-related frequency derived from said conversion means; and
   means to control the direction of motor drive according to the direction of error detected by the instrument.

2. A regulating system for producing a relatively constant value including an instrument responsive to the value, a non-constant source from which the value can be derived, an adjustable regulator by which the constant value can be derived from the non-constant source, and means for controlling the adjustable regulator under command of the instrument including:
   a pair of pick-up elements varied oppositely by the instrument, substantially without influence on its accuracy, in response to variations of the value which it measures for producing value-related voltages which are likewise inversely varied;
   conversion means responsive to the pick-up elements for producing value-related frequencies varying with variations of said value-related voltage;
   and a motor connected to adjust said adjustable regulator and designed to run synchronously with a wide range of energizing value-related frequencies;
   and means to energize said motor according to the varying value-related frequency derived from said conversion means; and
   means to control the direction of motor drive according to the direction of error detected by the instrument.

3. A regulating system for producing a relatively constant value including an instrument responsive to the value, a non-constant source from which the value can be derived, an adjustable regulator by which the constant value can be derived from the non-constant source, and means for controlling the adjustable regulator under command of the instrument including:
   a pair of translators positioned to receive influence varied oppositely by the instrument in response to variations of the value which it measures; and
   comprising means for producing value-related outputs of continuous type which are, likewise inversely varied;
   conversion means responsive to the translators for converting their value-related output to impulse signals of value-related frequency varying with the value of said outputs;
   and a motor connected to adjust said regulator and designed to run synchronously with a wide range of energizing value-related frequencies;
   and means to energize said motor according to the varying value-related frequency derived from said conversion means; and
   means to control the direction of motor drive according to the direction of error detected by the instrument.

4. Apparatus for providing a regulated sine-wave voltage, including an adjustable autotransformer and a reversible motor system for adjusting it responsive in equal steps to impulses of a wide range of frequencies;
   means responsive to departures of the voltage from a desired value for producing impulses, to which said motor, is responsive, at a value-related frequency increasing as said departure increases; and
   means responsive to the direction of the departure to control the direction of the motor drive.

5. Apparatus for providing a regulated sine-wave voltage according to claim 4, in which the means responsive to the voltage includes an instrument tending to exert a force for moving an output element and translating means responsive to said force without impeding the accuracy of the instrument.

References Cited

UNITED STATES PATENTS

| | | | |
|---|---|---|---|
| 3,068,388 | 12/1962 | Burski | 318—20.810 |
| 3,233,168 | 2/1966 | Kettler et al. | 323—66 |
| 3,238,444 | 3/1966 | Perrins | 323—66 |
| 3,262,034 | 7/1966 | Thoresen | 318—20.605 |
| 3,349,785 | 10/1967 | Duffy | 318—326 X |

JOHN F. COUCH, Primary Examiner

G. GOLDBERG, Assistant Examiner

U.S. Cl. X.R.

318—18, 28, 138; 323—45, 66; 324—99